3,070,493
PHOSPHORO CARBIMIDATES

Glenn R. Price, South Chicago Heights, and Edward N. Walsh, Chicago Heights, Ill., and James T. Hallett, Saratoga, Calif., assignors to Stauffer Chemical Company, New York, N.Y., a corporation of Delaware
No Drawing. Filed Apr. 10, 1961, Ser. No. 101,673
23 Claims. (Cl. 167—30)

This invention relates to a new class of phosphorus containing pesticides and a process for utilizing the same.

In particular this invention relates to new compounds having a novel disulfide configuration which provides new and valuable characteristics. These new compounds have been found to be useful in the elimination and control of numerous insect pests as will be shown hereafter.

These new compounds are phosphoro carbimidates which may be represented by the formula:

$$\begin{array}{c} R_1O \\ \phantom{R_1}\diagdown \\ \phantom{R_1O}P-S-S-C \\ \phantom{R_1}\diagup \phantom{\|} \phantom{-S-S-C}\diagdown \\ R_2O \phantom{\diagup} \phantom{-S-S-C} XR_4 \end{array} \begin{array}{c} \phantom{R_1O}O \phantom{\diagdown} \phantom{P} \phantom{\diagdown} NR_3 \\ \phantom{R_1O\diagdown}\| \phantom{P} \phantom{\diagup} \\ \phantom{R_1O\diagdown P}\diagup \end{array}$$

wherein $R_1$ and $R_2$ are the same or different alkyl redicals, $R_3$ may be alkyl or aryl, $R_4$ may be alkyl or aryl and X is oxygen or sulfur. They may be prepared according to the following general reaction:

$$(R_1O) \diagdown \phantom{P(O)SY}$$
$$\phantom{(R_1O)\diagdown}P(O)SY + R_3NHC(S)XR_4 + R_5N \longrightarrow$$
$$(R_2O)\diagup$$

$$\begin{array}{cc} (R_1O)\diagdown & NR_3 \\ \phantom{(R_1O)\diagdown}P(O)-S-S-C\diagdown & + R_5N\cdot HY \\ (R_2O)\diagup & XR_4 \end{array}$$

wherein $R_1$, $R_2$, $R_3$, $R_4$ and X are as defined above, Y is a halogen, and $R_5N$ is a tertiary amine hydrogen halide acceptor.

Among the alkyl radicals which we have found suitable for the phosphorus ester portion of the molecule are the methyl, ethyl, propyl, butyl, octyl, and decyl radicals as well as combinations resulting in mixed esters such as methyl ethyl, ethyl octyl, methyl, butyl, ethyl propyl and the like. Suitable alkyl or aryl radicals for $R_3$ and $R_4$ include methyl, ethyl, propyl, butyl, octyl, phenyl, chlorophenyl, nitrophenyl and the like.

The hydrogen halide acceptor may be any of the well-known alkaline compounds suitable for this use. In particular we prefer to use tertiary amines such as pyridine, triethylamine, trimethylamine and the like.

The process is preferably carried out in an inert solvent in the presence of the hydrogen halide acceptor by adding approximately stoichiometric amounts of O,O-dialkyl-phosphorosulfenyl halide to the appropriate thiocarbamate.. The reaction is nearly instantaneous at temperatures from about 0° C. to ordinary room temperature, although it is best to stir the final thickened reaction mixture for a short while to ensure complete reaction. The product is then recovered by filtering off the halide salt or by other well-known means such as washing out the salt.

The following examples illustrate the compounds of our invention:

EXAMPLE 1

To a solution of 7.9 grams of pyridine and 18.1 grams of N-phenyl-O-ethyl-thiocarbamate in 200 cc. of ether was added 20.4 grams of O,O-diethylphosphorosulfenyl chloride over a 30 minute period at 10° C. The crude product was stirred for two hours at room temperature and then filtered to remove the pyridine hydrochloride. The crude product was stabilized to 50° C. at 1.0 mm. of Hg to yield 30.5 grams (87% yield). The product analyzed as 10.0% P and 21.6% S compared to 10.7% P and 22.1% S theoretical for $$(C_2H_5O)_2P(O)-S-S-C\begin{array}{c}\diagup NC_6H_5 \\ \diagdown OC_2H_5\end{array}$$

EXAMPLE 2

Following the procedure of Example 1, but using N-p-chlorophenyl-O-ethyl thiocarbamate, 36 grams (96%) of $$(C_2H_5O)_2-P(O)-S-S-C=NC_6H_4Cl$$
$$\phantom{(C_2H_5O)_2-P(O)-S-S-C=}|$$
$$\phantom{(C_2H_5O)_2-P(O)-S-S-}OC_2H_5$$

was prepared which analyzed 7.4% P and 16.0% S compared to 8.1% P and 16.7% S theoretical.

EXAMPLE 3

Following the procedure of Example 1 but using N-phenyl-O-methyl thiocarbamate, 60.0 grams (92%) of $$(C_2H_5O)_2-P(O)-S-S-C=NC_6H_5$$
$$\phantom{(C_2H_5O)_2-P(O)-S-S-C=}|$$
$$\phantom{(C_2H_5O)_2-P(O)-S-S-}OCH_3$$

was prepared which had an index of refraction $$N_D^{25}=1.5540$$

and analyzed 8.6% P and 18.7% S compared to 9.25% P and 19.1% S theoretical.

EXAMPLE 4

In a similar manner but using N-phenyl-O-isopropyl thiocarbamate, a 90% yield of product was obtained. This material analyzed as 8.55% P and 17.4% S compared with 8.5% P and 17.6% S theoretical for $$C_2H_5O)_2P(O)-S-S-C=NC_6H_5$$
$$\phantom{C_2H_5O)_2P(O)-S-S-C=}|$$
$$\phantom{C_2H_5O)_2P(O)-S-S-}OC_3H_7$$

EXAMPLE 5

Following the procedure of Example 1 but using O,O-dimethylphosphorosulfenyl chloride, 57 grams (93% yield) of $$(CH_3O)_2P(O)-S-S-C=NC_6H_5$$
$$\phantom{(CH_3O)_2P(O)-S-S-C=}|$$
$$\phantom{(CH_3O)_2P(O)-S-S-}OC_2H_5$$

was prepared which analyzed as 8.9% P 18.8% S compared with 9.65% P and 19.9% S theoretical.

EXAMPLE 6

In a similar manner $$(C_8H_{17}O)_2P(O)-S-S-C=NC_6H_5$$
$$\phantom{(C_8H_{17}O)_2P(O)-S-S-C=}|$$
$$\phantom{(C_8H_{17}O)_2P(O)-S-S-}OCH_3$$

was made in 84.5% yield, $N_D^{25}=1.5124$, analysis 6.05% P and 12.5% S (theoretical 6.16% P, 12.7% S).

EXAMPLE 7

In a similar manner $$(C_8H_{17}O)(C_2H_5O)P(O)-S-S-C=NC_6H_5$$
$$\phantom{(C_8H_{17}O)(C_2H_5O)P(O)-S-S-C=}|$$
$$\phantom{(C_8H_{17}O)(C_2H_5O)P(O)-S-S-}OCH(CH_3)_2$$

was made in 99% yield, $N_D^{25}=1.5176$.

EXAMPLE 8

To a solution of 29.7 grams of N-phenyl-S-ethyl dithiocarbamate in 150 ml. of ether was added 15.2 grams of triethylamine. The solution was cooled to 10° C. and 30.6 grams of O,O-diethylphosphorosulfenyl chloride was added over a 30 minute period. The reaction mixture was stirred for an additional hour at room temperature and then at reflux for 30 minutes. After filtering and removing the solvent, the product was stabilized to 50° C. at 1.0 mm. Hg pressure. A yield of 51.5 grams (95.5%) was obtained with an index of refraction $N_D^{25}=1.5802$ and which analyzed 7.32% P and 26.4% S compared to 8.5% P and 26.3% S for

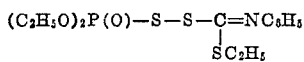

EXAMPLE 9

Following the procedure of Example 8, but using N-phenyl-S-butyl dithiocarbamate, 51.0 grams of

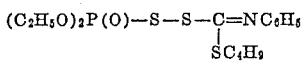

was prepared which had an index of refraction $$N_D^{25} = 1.5704$$

and analyzed as 7.5% P and 25.2% S compared to 8.5% P and 26.3% S theoretical.

Using the process as outlined above the following additional compounds were made.

water." The latter contains 2.5 grams of Vatsol and 1.0 gram of Methocel per 20 liters of water. Each solution is then sprayed onto the insects using a DeVilbiss hand sprayer in a fume hood. Mortality is reported after 72 hours as percent kill/percent concentration.

In addition to the above insects, tests were also run on the two-spotted mite, *Tetranychus telarius* (designated 2SM) and the effects were additionally noted on the eggs (designated 2SME). The tests were conducted by infesting young Pinto bean plants in the primary leaf stage with several hundred mites. The infested plants were then sprayed to run-off using the sprayer and solutions previously described. The results are again reported as percent kill/percent concentration. The miticidal activity is determined after seven days but the ovicidal results require fourteen days.

The following results were obtained using the compounds of this invention.

Table I

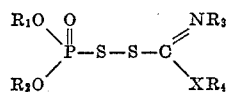

| Example | R₁ | R₂ | R₃ | X | R₄ | $N_D^{25}$ | Analysis | | Theoretical | | Yield, percent |
|---|---|---|---|---|---|---|---|---|---|---|---|
| | | | | | | | Percent P | Percent S | Percent P | Percent S | |
| 10 | CH₃ | CH₃ | C₆H₅ | S | C₂H₅ | 1.6012 | 8.10 | 29.4 | 8.90 | 27.7 | 93.0 |
| 11 | CH₃ | CH₃ | C₆H₅ | S | C₄H₉ | 1.5853 | 6.40 | 25.7 | 8.25 | 25.6 | 92.5 |
| 12 | C₈H₁₇ | C₈H₁₇ | C₆H₅ | S | C₂H₅ | 1.5343 | 5.93 | 17.3 | 5.80 | 18.0 | 81.0 |
| 13 | C₈H₁₇ | C₂H₅ | C₆H₅ | S | C₂H₅ | 1.5422 | 7.40 | 20.0 | 6.90 | 21.4 | 95.5 |
| 14 | C₈H₁₇ | C₈H₁₇ | C₂H₅ | O | C₃H₇ | 1.4768 | 6.35 | 13.4 | 6.42 | 13.2 | 91.5 |
| 15 | C₂H₅ | C₂H₅ | C₄H₉ | O | C₂H₅ | 1.4715 | 9.60 | 18.5 | 9.45 | 19.4 | 99.0 |
| 16 | C₂H₅ | C₂H₅ | C₃H₇ | O | C₂H₅ | 1.4856 | 9.50 | 19.6 | 9.85 | 20.3 | 92.0 |
| 17 | C₂H₅ | C₂H₅ | C₂H₅ | O | C₂H₅ | 1.4922 | 10.30 | 20.6 | 10.30 | 21.2 | 94.0 |
| 18 | C₂H₅ | C₂H₅ | C₂H₅ | O | CH₃ | 1.4941 | 10.80 | 22.3 | 10.50 | 20.8 | 93.5 |
| 19 | CH₃ | CH₃ | C₃H₇ | O | C₂H₅ | 1.4973 | 8.80 | 20.4 | 10.70 | 22.1 | 100.0 |
| 20 | CH₃ | CH₃ | C₂H₅ | O | C₂H₅ | 1.5069 | 10.47 | 21.7 | 11.30 | 23.4 | 93.0 |
| 21 | CH₃ | CH₃ | C₂H₅ | O | CH₃ | 1.5110 | 9.95 | 21.2 | 12.00 | 24.6 | 90.5 |
| 22 | C₂H₅ | C₂H₅ | C₃H₇ | O | C₃H₇ | 1.4845 | 8.95 | 19.3 | 9.40 | 19.4 | 84.5 |
| 23 | CH₃ | CH₃ | C₃H₇ | O | C₃H₇ | 1.4633 | 10.60 | 21.0 | 10.3 | 21.2 | 93.5 |

The class of compounds characterized by the foregoing examples has been found to have valuable pesticidal properties. In particular, these compounds are valuable in the control of common insect pests. By the term "insect" we do not intend to be limited to the narrow technical usage of this term to include only six-legged pests but intend the broader more common usage which includes spiders, mites, ticks, caterpillars, nematodes and the like.

In the following described tests demonstrating the utility of our new compounds, four insect species representing four insect orders were used. These species are:

(1) American cockroach—*Periplaneta americana*—Orthoptera (designated AR)
(2) Confused flour beetle—*Tribolium confusum*—Coleoptera (designated CFB)
(3) House fly—*Musca domestica*—Diptera (designated HF)
(4) Spotted milkweed bug—*Oncopeltus fasciatus*—Heteroptera (designated MWB)

In conducting the tests, the compounds are made up into solutions, normally 0.1% concentration, using "wet

Table II

| Example | Insect | | | | | |
|---|---|---|---|---|---|---|
| | HF | AR | MWB | CFB | 2SM | 2SME |
| 1 | 52/.0001 | 100/.03 | 90/.01 | 100/.001 | | |
| 2 | 60/.0001 | 100/.1 | 100/.1 | 100/.1 | | |
| 3 | 100/.1 | 100/.1 | 100/.1 | 100/.1 | 50/.12 | 50/.12 |
| 4 | 100/.1 | 100/.1 | 100/.1 | 100/.1 | 50/.12 | 50/.12 |
| 5 | 24/.1 | 0/.1 | 0/.1 | 0/.1 | | |
| 15 | 100/.0005 | 100/.1 | 100/.1 | 100/.1 | | |
| 16 | 100/.1 | 100/.1 | 100/.1 | 100/.1 | 0/.12 | 0/.12 |
| 17 | 100/.1 | 100/.1 | 100/.1 | 100/.1 | 50/.12 | 50/.12 |
| 18 | 100/.1 | 100/.1 | 100/.1 | 100/.1 | 50/.12 | 50/.12 |
| 19 | 100/.1 | 0/.1 | 80/.1 | 0/.1 | 0/.12 | 0/.12 |
| 20 | 92/.1 | 0/.1 | 0/.1 | 0/.1 | 0/.12 | 0/.12 |
| 21 | 92/.1 | 0/.1 | 0/.1 | 0/.1 | 0/.12 | 0/.12 |
| 22 | 100/.1 | 100/.1 | 100/.1 | 100/.1 | 90/.12 | 0/.12 |
| 23 | 100/.1 | 0/.1 | 100/.1 | 0/.1 | 0/.12 | 0/.12 |

From these data it can be seen that these new compounds are valuable insecticides. Although the specific examples show the use of aqueous solutions of these compounds as insecticides, they may also be used in the form of emulsions, non-aqueous solutions, wettable powders, vapors, and dusts as may be best fitted to the conditions of use.

The concentration normally used for initial testing is a 0.1% solution. As noted above, however, many of these new compounds are effective pesticides at much lower levels, as low as 0.0001% in some instances. Since the effective concentration may vary with each compound and each pest to which it is applied, a general numerical range of concentrations cannot be stated. It is well within the skill of the art, however, to determine the effective concentration necessary to kill a significant proportion of a specific pest or combination of pests under certain conditions of application.

The foregoing description is given for clearness of understanding only and no unnecessary limitations should be understood therefrom as modification will be obvious to those skilled in the art.

We claim:

1. Compounds having the formula

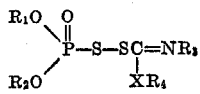

wherein $R_1$ and $R_2$ are alkyl radicals, $R_3$ and $R_4$ are members of the class consisting of lower alkyl, phenyl and substituted phenyl radicals and X is a member of the class consisting of oxygen and sulfur.

2. The compound represented by formula

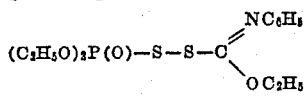

3. The compound represented by the formula

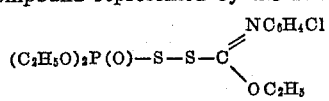

4. The compound represented by the formula

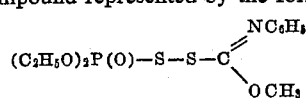

5. The compound represented by the formula

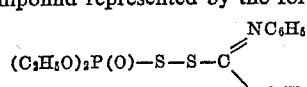

6. The compound represented by the formula

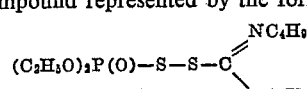

7. The compound represented by the formula

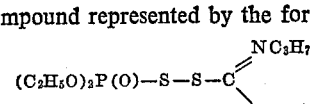

8. The compound represented by the formula

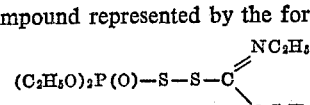

9. The compound represented by the formula

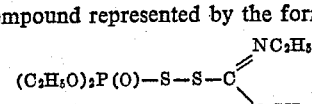

10. The compound represented by the formula

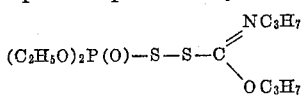

11. The compound represented by the formula

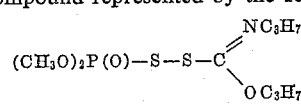

12. A process for controlling pests comprising applying thereto an effective concentration of a compound represented by the formula

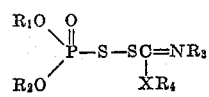

wherein $R_1$ and $R_2$ are alkyl radicals, $R_3$ and $R_4$ are members of the class consisting of lower alkyl, phenyl and substituted phenyl radicals and X is a member of the class consisting of oxygen and sulfur.

13. A process for controlling pests comprising applying thereto an effective concentration of the compound of claim 2.

14. A process for controlling pests comprising applying thereto an effective concentration of the compound of claim 3.

15. A process for controlling pests comprising applying thereto an effective concentration of the compound of claim 4.

16. A process for controlling pests comprising applying thereto an effective concentration of the compound of claim 5.

17. A process for controlling pests comprising applying thereto an effective concentration of the compound of claim 6.

18. A process for controlling pests comprising applying thereto an effective concentration of the compound of claim 7.

19. A process for controlling pests comprising applying thereto an effective concentration of the compound of claim 8.

20. A process for controlling pests comprising applying thereto an effective concentration of the compound of claim 9.

21. A process for controlling pests comprising applying thereto an effective concentration of the compound of claim 10.

22. A process for controlling pests comprising applying thereto an effective concentration of the compound of claim 11.

23. A process for preparing compounds having the formula

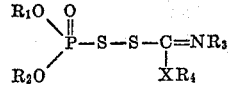

wherein $R_1$ and $R_2$ are alkyl radicals, $R_3$ and $R_4$ are members of the class consisting of lower alkyl, phenyl and substituted phenyl radicals and X is a member of the class consisting of oxygen and sulfur, which comprises reacting substantially stoichiometric quantities of a compound having the formula

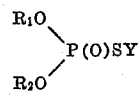

wherein Y is a halogen atom with a compound having the formula $R_3NHC(S)XR_4$ in the presence of a hydrogen halide acceptor.

No references cited.